United States Patent [19]
Baber

[11] Patent Number: 5,446,856
[45] Date of Patent: Aug. 29, 1995

[54] CIRCUITRY AND METHOD FOR ADDRESSING GLOBAL ARRAY ELEMENTS IN A DISTRIBUTED MEMORY, MULTIPLE PROCESSOR COMPUTER

[75] Inventor: Marc Baber, Portland, Oreg.

[73] Assignee: Intel Corporation, Santa Clara, Calif.

[21] Appl. No.: 357,083

[22] Filed: Dec. 15, 1994

Related U.S. Application Data

[63] Continuation of Ser. No. 184,784, Jan. 21, 1994, abandoned, which is a continuation of Ser. No. 692,673, Apr. 29, 1991, abandoned.

[51] Int. Cl.[6] .................. G06F 12/06; G06F 12/08
[52] U.S. Cl. .................. 395/401; 395/427; 364/DIG. 1; 364/DIG. 2; 364/229; 364/243; 364/228; 364/246
[58] Field of Search ... 364/200 MS File, 900 MS File; 395/400, 425

[56] References Cited

U.S. PATENT DOCUMENTS

| | | | |
|---|---|---|---|
| 5,025,365 | 6/1991 | Mathur et al. | 395/600 |
| 5,117,350 | 5/1992 | Parrish et al. | 395/425 |
| 5,123,094 | 6/1992 | MacDougall | 395/375 |
| 5,197,140 | 3/1993 | Balmer | 395/400 |
| 5,197,143 | 3/1993 | Lary et al. | 395/425 |
| 5,212,777 | 5/1993 | Gove et al. | 395/375 |
| 5,247,673 | 9/1993 | Costa et al. | 395/650 |
| 5,269,013 | 12/1993 | Abramson et al. | 395/425 |

OTHER PUBLICATIONS

W. H. Press et al., *Numerical Recipes in C*, 1988. Pp. 14–21 and 704–707.
Piyush Mehrotra, *Programming Parallel Architecture: The BLAZE Family of Languages*, 1989. Pp. 289–299.
Charles Koelbel et al., "Semi–Automatic Domain Decomposition in Blaze," Proceedings of the 1987 International Conference on Parallel Processing, pp. 521–524 (Aug. 17–21, 1987).
David Callahan et al., "Compiling Programs for Distributed–Memory Multiprocessors," The Journal of Supercomputing, vol. 2, No. 2, pp. 151–169 (1988).
Michael J. Quinn et al., "Compiling C* Programs for a Hypercube Multicomputer," Proceedings of the ACM/SIGPLAN PPEALS 1988, SIGPLAN Notices, vol. 23, No. 9, pp. 57–65 (Sep. 1988).

(List continued on next page.)

*Primary Examiner*—David L. Robertson
*Assistant Examiner*—Matthew Kim
*Attorney, Agent, or Firm*—Blakely, Sokoloff, Taylor & Zafman

[57] ABSTRACT

A method of addressing an arbitrary global element stored within a first local memory associated with a first processing device is described for a distributed memory computers which includes a multiplicity of processing devices each having an associated base pointer or memory location and an associated memory, each of the local memories storing a subarray of a global array, each subarray having a subarray base element, each of the memories having a subarray base element memory address with said global array including a multiplicity of global elements. The method includes the steps of calculating subarray offsets for each subarray, calculating base pointer values for each processing device based upon its associated subarray offset, generating base pointer electrical values represented of a base pointer values, storing base pointer electrical signals within base pointer memory location, receiving an offset signal representative of the offset of the arbitrary global element, and generating address signals for the first local memory by combining the base pointer electrical signal for the first processing device with the arbitrary with element offset signals. Circuitry for addressing an arbitrary global element stored within a first local memory associated with a first processing device is also described in a context of the distributed memory computer having a multiplicity of processing devices, each one having a base pointer memory location and an associated memory, each of the memory storing a subarray of a global array and having a base element, each memory having a base element address and the global array including a multiplicity of global elements.

21 Claims, 5 Drawing Sheets

OTHER PUBLICATIONS

M. Rosing et al., "An Overview of Dino-A New Lang. for Num. Comp. on Distrib. Memory Multiproc.," *Parallel Proc. for Sci. Computing*, Soc. for Ind. & Appl. Math., pp. 312-316 (1989).

Hans P. Zima et al., "Superb: A tool for Semi-Automatic MIMD/SIMD Parallelization," Parallel Computing 6, Elsevier Science Publishers B.V. (North-Holland) pp. 1-18 (1988).

Ping-Sheng Tseng, "A Parallelizing Compiler for Distributed Memory Parallel Computers," Carnegie Mellon University-CS-89-148, pp. 1-81 (May 1989).

Anne Rogers et al., "Process Decomposition Through Locality of Reference," ACM Press, SIGPLAN Notices, vol. 24, No. 7, 69-80 (Jul. 1989).

Charles Koelbel et al., "Semi-automatic Process Partioning for Parallel Computation," International Journal of Parallel Programming, vol. 16, No. 6, pp. 365-382 (Dec. 1987).

R. Allen et al., "Automatic Decomp. of Scientific Programs for Parallel Execution," Conf. Rec. of the 14th Annual ACM Symp. on Principles of Programming Lang., pp. 63-76 (Jan. 21-23, 1987).

Global Array

$$\begin{bmatrix} 1 & 2 & 3 & 4 \\ (0,0) & (0,1) & (0,2) & (0,3) \\ & & & \\ 5 & 6 & 7 & 8 \\ (1,0) & (1,1) & (1,2,) & (1,3) \\ & & & \\ 9 & 10 & 11 & 12 \\ (2,0) & (2,1,) & (2,2) & (2,3) \\ & & & \\ 13 & 14 & 15 & 16 \\ (3,0) & (3,1) & (3,2) & (3,3) \end{bmatrix}$$

*Figure 1A*

Subarray 0
$$\begin{bmatrix} 1 & 2 \\ (0,0) & (0,1) \\ [0,0] & [0,1] \\ & \\ 5 & 6 \\ (1,0) & (1,1) \\ [1,0] & [1,1] \end{bmatrix}$$

Subarray 1
$$\begin{bmatrix} 3 & 4 \\ (0,2) & (0,3) \\ [0,0] & [0,1] \\ & \\ 7 & 8 \\ (1,2) & (1,3) \\ [1,0] & [1,1] \end{bmatrix}$$

Subarray 2
$$\begin{bmatrix} 9 & 10 \\ (2,0) & (2,1) \\ [0,0] & [0,1] \\ & \\ 13 & 14 \\ (3,0) & (3,1) \\ [1,0] & [1,1] \end{bmatrix}$$

Subarray 3
$$\begin{bmatrix} 11 & 12 \\ (2,2) & (2,3) \\ [0,0] & [0,1] \\ & \\ 15 & 16 \\ (3,2) & (3,3) \\ [1,0] & [1,1] \end{bmatrix}$$

*Figure 1B*

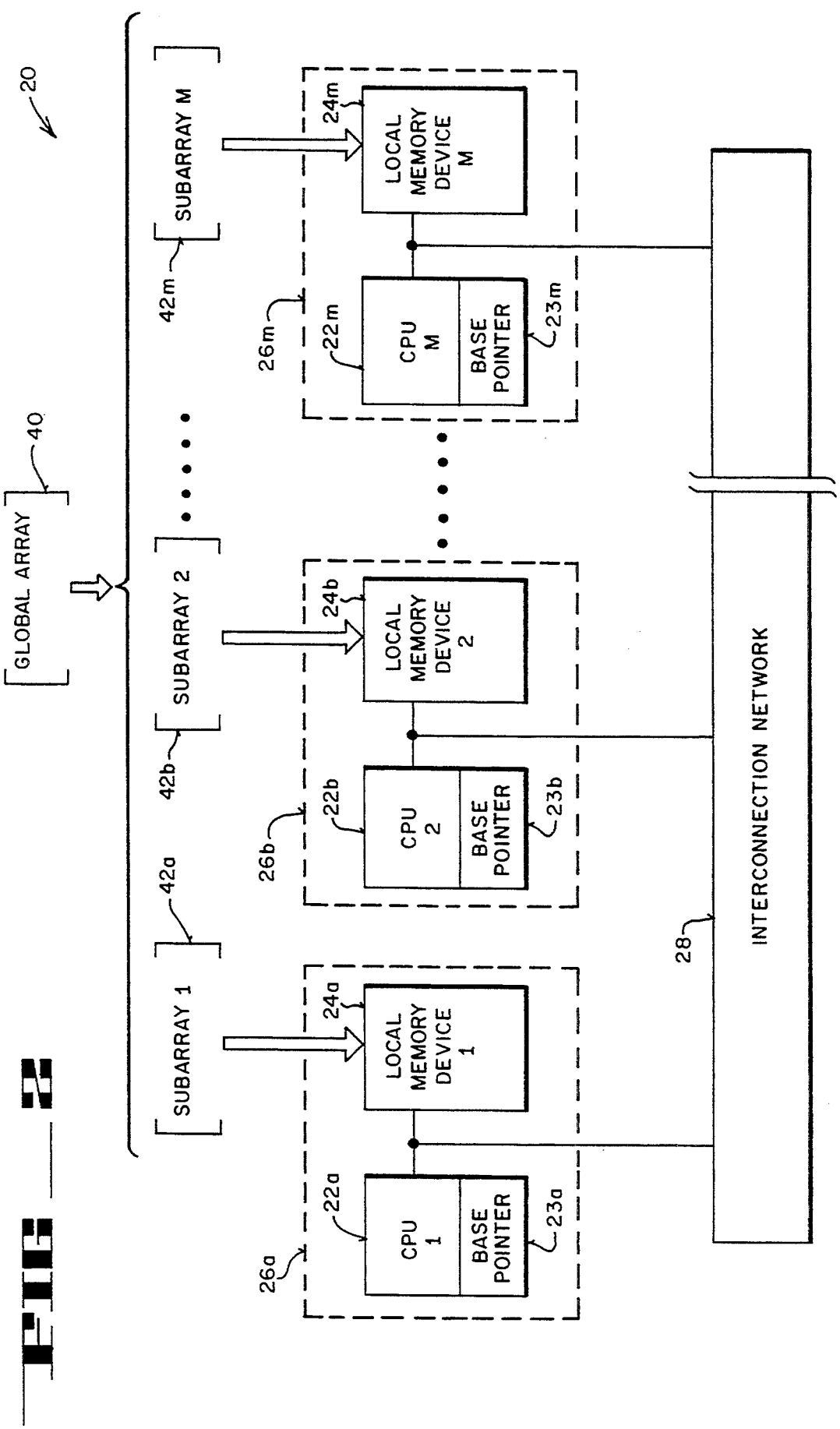

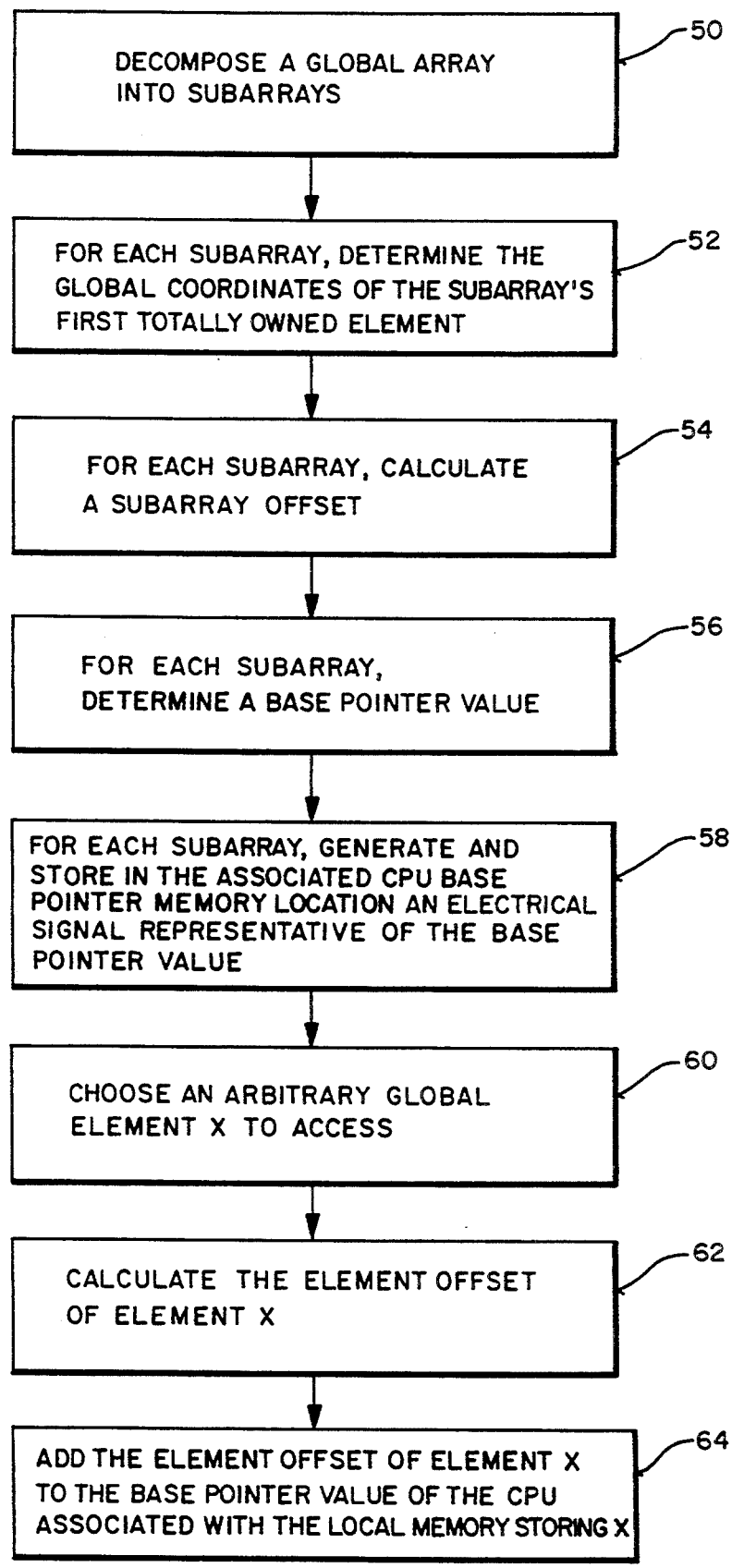
FIG_3

| 82 | | | | | | | |
|---|---|---|---|---|---|---|---|
| 0<br>(0,0) | 1<br>(0,1) | 2<br>(0,2) | 3<br>(0,3) | 4<br>(0,4) | 5<br>(0,5) | 6<br>(0,6) | 7<br>(0,7) |
| 8<br>(1,0) | 9<br>(1,1) | 10<br>(1,2) | 11<br>(1,3) | 12<br>(1,4) | 13<br>(1,5) | 14<br>(1,6) | 15<br>(1,7) |
| 16<br>(2,0) | 17<br>(2,1) | 18<br>(2,2) | 19<br>(2,3) | 20<br>(2,4) | 21<br>(2,5) | 22<br>(2,6) | 23<br>(2,7) |
| 24<br>(3,0) | 25<br>(3,1) | 26<br>(3,2) | 27<br>(3,3) | 28<br>(3,4) | 29<br>(3,5) | 30<br>(3,6) | 31<br>(3,7) |
| 32<br>(4,0)<br>[0,0] | 33<br>(4,1)<br>[0,1] | 34<br>(4,2)<br>[0,2] | 35<br>(4,3)<br>[0,3] | 36<br>(4,4) | 37<br>(4,5) | 38<br>(4,6) | 39<br>(4,7) |
| 40<br>(5,0)<br>[1,0] | 41<br>(5,1)<br>[1,1] | 42<br>(5,2)<br>[1,2] | 43<br>(5,3)<br>[1,3] | 44<br>(5,4) | 45<br>(5,5) | 46<br>(5,6) | 47<br>(5,7) |
| 48<br>(6,0)<br>[2,0] | 49<br>(6,1)<br>[2,1] | 50<br>(6,2)<br>[2,2] | 51<br>(6,3)<br>[2,3] | 52<br>(6,4) | 53<br>(6,5) | 54<br>(6,6) | 55<br>(6,7) |
| 56<br>(7,0)<br>[3,0] | 57<br>(7,1)<br>[3,1] | 58<br>(7,2)<br>[3,2] | 59<br>(7,3)<br>[3,3] | 60<br>(7,4) | 61<br>(7,5) | 62<br>(7,6) | 63<br>(7,7) |

| Address | C Data | FORTRAN Data |
|---------|--------|--------------|
| 0 | 32 | 32 |
| 1 | 33 | 40 |
| 2 | 34 | 48 |
| 3 | 35 | 56 |
| 4 | 40 | 33 |
| 5 | 41 | 41 |
| 6 | 42 | 49 |
| 7 | 43 | 57 |
| 8 | 48 | 34 |
| 9 | 49 | 42 |
| 10 | 50 | 50 |
| 11 | 51 | 58 |
| 12 | 56 | 35 |
| 13 | 57 | 43 |
| 14 | 58 | 51 |
| 15 | 59 | 59 |

*Figure 4b*

CIRCUITRY AND METHOD FOR ADDRESSING GLOBAL ARRAY ELEMENTS IN A DISTRIBUTED MEMORY, MULTIPLE PROCESSOR COMPUTER

This is a continuation of application Ser. No. 08/184.784, filed Jan. 21, 1994 now abandoned which is a continuation of application Ser. No. 07/692,673, filed Apr. 29, 1991, now abandoned.

FIELD OF THE INVENTION

The present invention relates to the field of distributed memory systems. More particularly, the present invention relates to circuitry and method for addressing global array elements within distributed memory computers.

BACKGROUND OF THE INVENTION

The demand for ever faster computation has caused a switch from single central processing unit (CPU) computers to multiple CPU computers. The theory behind this switch is that what one CPU can accomplish multiple CPUs can accomplish more quickly by operating in parallel.

The realization of the full potential of multiple CPU computers has been impeded by memory architecture. One type of prior multiple CPU computer is based upon a distributed memory architecture. In a distributed memory computer each CPU is connected directly to one section of memory, called local memory. Processing time in distributed memory computers can be greatly decreased provided that data is apportioned among the local memories such that the majority of data accesses are local. Non-local data accesses typically result in higher network traffic and reduce the overall system performance of a distributed memory computer.

To reduce non-local data accesses, data arrays in programs are often decomposed into contiguous subarrays or "blocks" to preserve "locality of reference" in programs that calculate each array element's value from the values of it's immediate neighbors. This kind of program is fairly common and helps to preserve the abstraction of a global array when it is distributed over a distributed memory system.

The use of a single, global, addressing scheme also helps preserve the abstraction of a global array when it is distributed over a distributed memory computer. Unfortunately, the typical addressing scheme in a distributed memory computer does not accommodate a single, global, addressing scheme without significant overhead or increasing compiler complexity. To illustrate, consider FIG. 1. A global array, constituting the data to be distributed, is shown in FIG. 1A with global coordinates for each global element indicated below it in parentheses. The global array can be decomposed into subarrays, as shown in FIG. 1B. Indicated below each element is its global coordinates, in parentheses, and its subarray coordinates, in brackets.

Each subarray is stored in a local memory in sequential order according to the subarray coordinates. For example, with a row major language such as C the array elements would be stored in the following order: [0,0], [0,1], [1,0], [1,1]. In a column major language like FORTRAN the array elements would be stored in the following order: [0,0], [1,0], [0,1], [1,1]. The CPU associated with the local memory initially stores as its base pointer the memory location of the subarray base element; e.g. [0,0]. The local address of any array element within any subarray may be calculated from its local indices, using an offset from the unshifted base pointer. The formula for a row major language is:

$$O = X^* Y_{dim} + Y$$

where O is the offset of the element from the unshifted base pointer, X and Y are the element's local coordinates, and Ydim is the size of the local subarray in the Y dimension.

A simple addressing scheme for global data accesses is to subtract the subarray's global minima (the global coordinates of the subarray's base element) from the desired array element's global coordinates to obtain local coordinates. A subarray offset is then calculated using local coordinates and subarray dimensions. For a row major language, the subarray offset may be calculated by Equation (1).

$$O_{sub} = (X_b - X_{min})^* Y_{dim} + (Y_b - Y_{min}) \qquad (1)$$

where:

$O_{sub}$ is the subarray offset;

$X_b$, $Y_b$ are the global coordinates of the desired array element;

$X_{min}$, $Y_{min}$ are the global coordinates of the subarray element with the lowest global coordinates; i.e. the subarray global minima;

$Y_{dim}$ is the subarray dimension in the Y direction.

Note that Equation 1 will retrieve the appropriate array element only if the node containing the army element is addressed. In other words, this addressing scheme requires knowledge of the location of array elements within the distributed memory. How that information is obtained does not effect the addressing scheme.

For example, consider the accessing of global element (3,3) within subarray 3. First, the global minima for subarray 3 are determined. The global coordinates of the global minima are (2,2). Second, the global minima are subtracted from the global coordinates (3,3) to obtain local coordinates of: [1,1]. Finally, the local offset for global element (3,3) within subarray 3 is calculated according to Equation 1 above, where $Y_{dim}=2$.

A disadvantage of this scheme of global addressing is that the subtraction of subarray global minima from global coordinates must occur every time any array element is addressed. The subtraction step alone can result in a significant cost in performance.

Other methods that offer the ability to address to array elements by their global coordinates often support global addressing only in very restrictive addressing patterns. Often these methods result in parallel programs that can only run on a specific number of processors and must be recompiled if the user wishes to run the program with more or fewer processors.

SUMMARY OF INVENTION

One of the objects of the present invention is to provide circuitry and a method of addressing which increases performance in distributed memory computer systems.

Another object of the present invention is to provide circuitry and a method of addressing which is consistent for local and non-local data accesses within a distributed memory computer system.

Yet another object of the present invention is to provide circuitry and method that facilitates parallel programming by supporting global addressing of array elements.

A method of addressing an arbitrary global array element J stored within a memory K associated with a processing device L is described within the context of a distributed memory computer having a multiplicity of processing devices each having an associated base pointer memory location and an associated memory, each of said memories storing a subarray of a global array including a multiplicity of global elements. The method includes calculating a subarray offset for each subarray. A base pointer value is then calculated using the subarray offset and the address of the associated subarray base element. For each subarray, an electrical signal representative of the base pointer value is generated and stored within each processing device's associated base pointer memory location. After an electrical signal representing the offset of an arbitrary global element J is received it is combined with the base pointer electrical signal to generate a memory address signal for arrangement J within memory K.

A circuit for addressing an arbitrary global element J stored within a memory K associated with a processing device L is described in the context of a distributed memory computer having a multiplicity of processing devices each having an associated base pointer memory location and an associated memory, each of said memories storing a subarray of a global array including a multiplicity of global elements, each global array element having a predetermined array offset from a base subarray element stored within memory K. The circuit includes means for calculating a subarray offset for each subarray and means for generating an offset electrical signal representative of the subarray offset for each subarray. The offset electrical signal for each subarray is stored in a base pointer memory location associated with each processing device. A means for generating an offset for global element J representative of the offset of global element J from the subarray base element is included and coupled to a means for generating an address signal for the element J by combining the base pointer electrical signal for memory device K with the global element J offset signal.

Other objects, features, and advantages of the present invention will be apparent from the accompanying drawings and from the detailed description that follows below.

BRIEF DESCRIPTION OF DRAWINGS

The present invention is illustrated by way of example and not limitation in the figures of the accompanying drawings in which like references indicated like elements and in which:

FIG. 1A is a global array;
FIG. 1B arrays of the global array shown in FIG. 1A;
FIG. 2 is diagram a distributed memory computer;
FIG. 3 is a flow diagram of the method of addressing;
FIG. 4a is a global array;
FIG. 4b is a table of a local memory's contents.

DETAILED DESCRIPTION OF INVENTION

FIG. 2 illustrates in block diagram form a distributed memory computer 20, which implements the global addressing scheme of the present invention. As will be described in more detail below, distributed memory computer 20 utilizes unique base pointers that allow a global addressing scheme to be used for both local and non-local data accesses.

Distributed memory computer 20 includes m central processing units (CPUs) 22a, 22b, 22c ... 22m, where m is an arbitrary number. CPUs 22a, 22b, 22c ... 22m may be realized using any conventional microprocessor; Intel's 386, 486, or 860 microprocessors for example.

Each CPU 22a, 22b, 22c ... 22m has an associated local memory 24a, 24b, ... 24m. Local memories 24a, 24b, ... 24m may be realized using any conventional semiconductor memory device. For example, DRAMs, SRAMs, and ROMs would all be acceptable implementations. Each local memory 24a, 24b, ... 24m may also be realized using multiple memory devices.

Each CPU 22a, 22b, ... 22m is directly connected to its associated local memory 24a, 24b, ... 24m. Together each CPU and its associated local memory form a node 26a, 26b, ... 26m.

Nodes 26a, 26b, ... 26m communicate with each other via interconnection network 28. Interconnection network 28 permits each CPU 22a, 22b, ... 22m to access data not stored within its associated local memory 24a, 24b, ... 24m. In other words, interconnection network 28 facilitates non-local data accesses. Interconnection network may facilitate non-local data accesses by keeping track of each local memory's base pointer or by keeping track of which node each array element is stored in.

Non-local data accesses are necessary because each CPU 22a, 22b, ... 22c potentially needs access to all data contained within global array 40, yet only a portion, or subarray 42a, 42b, ... 42m, of the global array 40 is stored within each local memory 24a, 24b, ... 24m.

The present invention increases the performance of distributed memory computer 20 by using a single global addressing scheme for both local and non-local data accesses. This is accomplished by pointing base pointers 23a, 23b, ... 23m at locations other than the location of the subarray base element.

The method of determining the values for base pointers 23a, 23b, 23m can be understood with reference to FIG. 3. FIG. 3 also illustrates the method of addressing global array elements using global coordinates, which can be understood in conjunction with the global array and subarrays of FIG. 4a. In FIG. 4a the global coordinates of each element are indicated in parentheses beneath the element and the subarray coordinates for subarray 86 are indicated in brackets.

To illustrate the global addressing scheme a single global array is distributed over a distributed memory computer. In practice, there may be any number of distributed arrays in the computer at any time. Each distributed global array typically has one subarray stored on each processor. Accordingly, for each subarray stored in local memory there will be an associated base pointer value.

The first step 50 shown in FIG. 3 is the decomposition of the global array into subarrays. The theory and manner of decomposition does not effect the calculation of base pointer values and therefore will not be discussed in detail here. Suffice it to say that global array 80 is divided into 4 subarrays 82, 84, 86 and 88 along the lines indicated in FIG. 4a.

As shown, the general practice is decompose global arrays into regular sized subarrays of equal size; however the addressing scheme of the present invention will function equally well with subarrays which are not regular in shape or equal in size provided each node has access to information about the size of every other subarray.

After decomposition, the data contained in each subarray 82, 84, 86 and 88 is stored within separate local memories 24a, 24b, ... or 24m. FIG. 4b illustrates schematically the contents of local memory 24c when storing the data contained in subarray 86. As can be seen, with both a column major language, C, and a row major language, FORTRAN, the elements in subarray 86 are stored in a sequential fashion according to subarray coordinates, with the lowest coordinate element occupying the lowest memory address. Step 52 requires determining for each subarray, 82, 84, 86, and 88, the global coordinates of the subarray base element, e.g. the element with subarray coordinates [0,0]. This element is also called the subarray's global minima. The base element of subarray 86 is 32 which has global coordinates of (4,0).

In step 54 a subarray offset with respect to the subarray base element is calculated for each subarray using the appropriate equation.

For an array stored using a row major language such as C the subarray offset can be calculated according to Equation 2.

$$O = (X_b * Y_{dim}) + Y_b \qquad (2)$$

where:
O is the subarray offset of the subarray;
$(X_b, Y_b)$ are the global array coordinates of the subarray base element;
$Y_{dim}$ is the dimension in the Y direction of the subarray.

According to Equation 2, the subarray offset for subarray 86 is 16, subarray 88 is 20, subarray 82 is 0, and for subarray 84 is 4.

For an array stored using a column major language such as FORTRAN the subarray offset can be calculated according to Equation 3.

$$O = (Y_b * X_{dim}) + X_b \qquad (3)$$

where:
O is the subarray offset;
$(X_b, Y_b)$ are the global array coordinates of the subarray base element;
$X_{dim}$ is the dimension in the X direction of the subarray.

Using Equation 3 the subarray offset for subarray 86 is 4, subarray 88 is 20, subarray 82 is 0, and subarray 84 is 16.

Step 56 determines a subarray base pointer value by subtracting the subarray offset calculated in step 54 from the memory address of the subarray base element. In subarray 86, the subarray base element, 32, is stored within local memory 24c at memory address 0. Thus, the base pointer value for CPU 22c would be −16 when the programming language is C and −4 when the programming language is FORTRAN.

Electrical signals representative of the base pointer values calculated in step 56 are generated and used to store a base pointer electrical signal in the base pointer memory location 23a, 23b, ... 23m of each subarray's associated CPU 22a, 22b, ... 22m. Alternatively, base pointer values for each CPU may be stored within the interconnection network 28, or any other convenient location, including but not limited to CPU registers and cache memories.

After steps 50-56 have been performed, any global element may be accessed locally or non-locally using steps 60-64. Data access begins in step 60 by choosing an arbitrary global element J, for example the element with global coordinates (5,3).

Step 62 calculates an array element offset for the arbitrary global array element J with respect to a subarray base element. Note that this step requires knowledge of the node in which global array element J is stored and the size of the subarray stored in the node. How that knowledge is obtained does not affect the addressing scheme. In a row major language, the offset for global array element J can be calculated using Equation 2 and substituting the global coordinates of element J $(X_j, Y_j)$ for the global minima $(X_b, Y_b)$. In other words, the offset of global array element J stored using a row major language is given by:

$$O_j = (X_j * Y_{dim}) + Y_j \qquad (4)$$

where:
$O_j$ is the offset in memory of global array element J from the base element of the subarray containing J;
$(X_j, Y_j)$ are the global coordinates of global array element J;
$Y_{dim}$ is the dimension in the Y direction of the subarray containing global array element J.

Using Equation 2 or 4 the element offset for element (5,3) equals 23.

Similarly, the offset for global array element J calculated using Equation 3 and substituting the global coordinates of J for $(X_b, Y_b)$ In other words, the offset global array element J stored using a column major language is:

$$O_j = (Y_j * X_{dim}) + X_j \qquad (5)$$

where:
$O_j$ is the offset in memory of global army element J from the base element of the subarray containing J;
$(X_j, Y_j)$ are the global coordinates of global array element J;
$X_{dim}$ is the dimension in the X direction of the subarray containing J.

Using Equation 3 or 5 the element offset for element (5,3) equals 17.

In step 64, an electrical signal representative of the offset for element J is generated and sent to the node in which global array element J is stored. In the case of global array element (5,3) the signal would be sent to the node including CPU 22c. In a C-based system the offset electrical signal for global array element J is combined with base pointer electrical signal stored base pointer 23c to produce a signal representative of address 7 (23−16=7) within local memory 24c. As can be seen in FIG. 4b, for C data, the data 43 corresponds to address 7 within local memory 24c. Examination of the global array of FIG. 4a reveals that 43 has global coordinates of (5,3). Similarly, in the case of a FORTRAN-based system, the offset electrical signal for global array element J is combined with base pointer electrical signal stored in base pointer 23c to produce a signal representative of address 13 (i.e., 17−4=13) within local memory 24c. As seen in FIG. 4b, for FORTRAN data, 43 corresponds to address 13 within local memory 24c. Again, examination of FIG. 4a shows that element 43 possesses global array coordinates of (5,3).

The calculation and generation of signals in steps 50-64 may be performed either by CPUs 22a, 22b ...

22m or by interconnection network 28, as dictated by design constraints.

The calculation of base pointer values has been illustrated using two dimensional subarrays; however, it is easily applied to other dimensional subarrays. For example, the form of offset equations, either $O_{sub}$ or $O_j$, for a 3-dimensional or subarray stored using C, or any other row major language, is:

$$O = (X_g \cdot Y_{dim} * Z_{dim}) + (Y_g * Z_{dim}) + Z_g \qquad (6)$$

where:

O is the offset of an element $(X_g, Y_g, Z_g)$ from the subarray base pointer;

$(X_g, Y_g, Z_g)$ are global array coordinates of an array element stored within a subarray;

$Y_{dim}, Z_{dim}$ are the Y and Z dimensions respectively of the subarray within which element $(X_g, Y_g, Z_g)$ is stored.

Similarly, the form of offset equations, e.g., $O_j$ and $O_{sub}$, for a 3-dimensional array or subarray is stored using FORTRAN, or any other column major language, is:

$$O = (Z_g \cdot Y_{dim} * X_{dim}) + (Y_g * X_{dim}) + X_g \qquad (7)$$

where:

O is the offset of an array element $(X_g, Y_g, Z_g)$ from the subarray base pointer;

$(X_g, Y_g, Z_g)$ are global array coordinates of an element stored within a subarray;

$Y_{dim}, X_{dim}$ are the Y and X dimensions respectively of the subarray within which element $(X_g, Y_g, Z_g)$ is stored.

The circuitry and method described are also applicable to situations in which the global array and subarray are unequal dimensions; for example, a 3-dimensional global array and 2-dimensional subarray.

Thus, circuitry and a method of addressing global array elements within a distributed memory computer using a single global addressing scheme has been described.

In the foregoing specification, the invention has been described with specific exemplary embodiments thereof. It will, however, be evident that various modifications and changes may be made thereto without departing from the broader scope of the invention as set forth in the appended claims. The specification and drawings are accordingly to be regarded in an illustrative rather than a restrictive sense.

What is claimed is:

1. A method of global addressing in a distributed memory computer having a multiplicity of local memories including a first local memory, each of the multiplicity of local memories storing a subarray of a global array, each subarray having a subarray base element, each of the local memories having a subarray base element memory address, the global array including a multiplicity of global elements, each of the local memories being associated with a processing device having a base pointer memory location for storing a base pointer pointing to the base element of the associated local memory, all of the multiplicity of local memories being accessible by each of the processing devices, the processing devices including a first processing device, a method of addressing an arbitrary global element stored within the first local memory associated with the first processing device, the method of global addressing comprising the steps of:

a. for each subarray:

1. calculating a subarray offset;

2. calculating a base pointer value for the processing device associated with the local memory storing the subarray based upon the subarray offset and the associated subarray base element address;

3. generating base pointer electrical signals representative of the base pointer value;

4. storing the base pointer electrical signals within the base pointer memory location associated with the processing device associated with the local memory storing the subarray;

b. receiving an arbitrary global element offset signal representative of the offset of the arbitrary global element; and c. generating address signals for local and nonlocal accesses of the arbitrary global element by combining the base pointer electrical signal for the first processing device with the arbitrary global element offset signal.

2. The method of global addressing of claim 1 wherein the global array and each of said subarrays are two dimensional.

3. The method of global addressing of claim 2 wherein the subarray offset for each subarray is calculated according to the formula:

$$O_{sub} = (X_b * Y_{dim}) + Y_b$$

where:

$O_{sub}$ is the subarray offset;

$(X_b, Y_b)$ are the global array coordinates of the subarray base element;

$Y_{dim}$ is the dimension in the Y direction of the subarray containing $(X_b, Y_b)$.

4. The method of global addressing of claim 2 wherein the arbitrary global element offset is calculated according to the formula:

$$O_j = X_j * Y_{dim} + Y_j$$

where:

$O_j$ is the offset of the arbitrary global element;

$(X_j, Y_j)$ are the global coordinates of the arbitrary global element; and $Y_{dim}$ is the Y dimension of the subarray containing the arbitrary global element.

5. The method of global addressing of claim 2 wherein the subarray offset for each subarray is calculated according to the formula:

$$O_{sub} = (Y_b * X_{dim}) + X_b$$

where:

$O_{sub}$ is the subarray offset;

$(X_b, Y_b)$ are the global array coordinates of the subarray base element;

$X_{dim}$ is the dimension in the X direction of the subarray containing element $(X_b, Y_b)$.

6. The method of global addressing of claim 2 wherein the element J offset is calculated according to the formula:

$$O_j = Y_j * X_{dim} + X_j$$

where:

$O_J$ is the offset of the arbitrary global element;

$(X_j, Y_j)$ are the global coordinates of the arbitrary global element;

$X_{dim}$ is the X dimension of subarray containing the arbitrary global element.

7. The method of global addressing of claim 1 wherein the global array and each of said subarrays are three dimensional.

8. The method of global addressing of claim 7 wherein the subarray offset for each subarray is calculated according to the formula:

$$O_{sub} = (X_b * Y_{dim} * Z_{dim}) + (Y_b * Z_{dim}) + Z_b$$

where:

$O_{sub}$ is the subarray offset;

$(X_b, Y_b, Z_b)$ are global array coordinates of the subarray base element;

$Y_{dim}, Z_{dim}$ are the Y and Z dimensions respectively of the subarray containing element $(X_b, Y_b, Z_b)$.

9. The method of global addressing of claim 7 wherein the arbitrary global element offset is calculated according to the formula:

$$O_j = (X_j * Y_{dim} * Z_{dim}) + (Y_j * Z_{dim}) + Z_j$$

where:

$O_j$ is the offset of the arbitrary global element;

$(X_j, Y_j, Z_j)$ are the global coordinates of the arbitrary global element; and $Y_{dim}, Z_{dim}$ are the Y and Z dimensions respectively of the subarray containing array the arbitrary global element.

10. The method of global addressing of claim 7 wherein the subarray offset for each subarray is calculated according to the formula:

$$O_{sub} = (Z_b * Y_{dim} * X_{dim}) + (Y_b * X_{dim}) + X_b$$

where:

$O_{sub}$ is the subarray offset;

$(X_b, Y_b, Z_b)$ are the global array coordinates of the subarray base element;

$Y_{dim}, X_{dim}$ are the Y and X dimensions of the subarray containing $(X_b, Y_b, Z_b)$.

11. The method of global addressing of claim 7 wherein the arbitrary global element offset is calculated according to the formula:

$$O_j = (Z_j * Y_{dim} * X_{dim}) + (Y_j * X_{dim}) + X_j$$

where:

$O_j$ is the offset of the arbitrary global element;

$(X_j, Y_j, Z_j)$ are the global coordinates of the arbitrary global element; and $Y_{dim}, X_{dim}$ are the Y and X dimensions of subarray containing the arbitrary global element.

12. A distributed memory computer having a multiplicity of local memories including a first local memory, each local memory storing a subarray of a global array, each subarray having a subarray base element, each of the local memories having a subarray base element memory address, the global array including a multiplicity of global elements and a global base element, each of the local memories being associated with a processing device, a first processing device being associated with the first local memory, each processing device having a base pointer memory location for storing a base pointer pointing to the base element of the associated local memory, all of multiplicity of local memories being accessible by each processing device circuitry for addressing an arbitrary global element stored within the first local memory associated with the first processing device, the distributed memory computer comprising:

a. means for calculating subarray offsets for each of the subarrays;

b. means for calculating base pointer values for each of the processing devices based upon each of the associated local memories associated subarray offset and associated subarray base element address;

c. means for generating base pointer electrical signals representative of the base pointer values;

d. means for storing the base pointer electrical signals within the base pointer memory location associated with each of the processing devices; and e. means for generating address signals for local and nonlocal accesses of the arbitrary global element by combining the base pointer electrical signals representative of the first processing device with the arbitrary global element offset signal representative of the offset of the arbitrary global element from the global base element.

13. The distributed memory computer of claim 12 wherein the global array and each of said subarrays are two dimensional.

14. The distributed memory computer of claim 13 wherein the subarray offset for each subarray is calculated according to the formula:

$$O_{sub} = (Y_b * X_{dim}) + X_b$$

where:

$O_{sub}$ is the subarray offset;

$(X_b, Y_b)$ are the global array coordinates of the subarray base element;

$X_{dim}$ is the dimension in the X direction of the subarray containing element $(X_b, Y_b)$.

15. The distributed memory computer of claim 13 wherein the arbitrary global element offset is calculated according to the formula:

$$O_j = (Y_j * X_{dim}) + X_j$$

where:

$O_j$ is the offset of the arbitrary global element;

$(X_j, Y_j)$ are the global array coordinates of the arbitrary global element; and $X_{dim}$ is the X dimension of the subarray containing the arbitrary global element.

16. The distributed memory computer of claim 13 wherein the subarray offset of each subarray is calculated according to the formula:

$$O_{sub} = (X_b * Y_{dim}) + Y_b$$

where:

$O_{sub}$ is the subarray offset;

$(X_b, Y_b)$ are the global array coordinates of the subarray base element;

$Y_{dim}$ is the dimension in the Y direction of the subarray containing $(X_b, Y_b)$.

17. The distributed memory computer of claim 12 wherein the global array and each of said subarrays are three dimensional.

18. The distributed memory computer of claim 17 wherein the subarray offset for each subarray is calculated according to the formula:

$$O_{sub}=(X_b*Y_{dim}*Z_{dim})+(Y_b*Z_{dim})+Z_b$$

where:
- $O_{sub}$ is the subarray offset;
- $(X_b, Y_b, Z_b)$ are global array coordinates of the subarray base;
- $Y_{dim}, Z_{dim}$ are the Y and Z dimensions respectively of the subarray containing element $(X_b, Y_b, Z_b)$.

19. The distributed memory computer of claim 17 wherein the arbitrary global element offset is calculated according to the formula:

$$O_j=(X_j*Y_{dim}*Z_{dim})+(Y_j*Z_{dim})+Z_j$$

where:
- $O_j$ is the offset of the arbitrary global element;
- $(X_j, Y_j, Z_j)$ are the global coordinates of the arbitrary global element; and
- $Y_{dim}, Z_{dim}$ are the Y and Z dimensions respectively of the subarray containing the arbitrary global element.

20. The distributed memory computer of claim 17 wherein the subarray offset for each subarray is calculated according to the formula:

$$O_{sub}=(Z_b*Y_{dim}*X_{dim})+(Y_b*X_{dim})+X_b$$

where:
- $O_{sub}$ is the subarray offset;
- $(X_b, Y_b, Z_b)$ are the global array coordinates of the subarray base element;
- $Y_{dim}, X_{dim}$ are the Y and X dimensions of the subarray containing $(X_b, Y_b, Z_b)$.

21. The distributed memory computer of claim 17 wherein the arbitrary global element offset is calculated according to the formula:

$$O_j=(Z_j*Y_{dim}*X_{dim})+(Y_j*X_{dim})+X_j$$

where:
- $O_j$ is the offset of the arbitrary global element;
- $(X_j, Y_j, Z_j)$ are the global coordinates of the arbitrary global element; and
- $Y_{dim}, X_{dim}$ are the Y and X dimensions of subarray containing the arbitrary global element.

* * * * *

UNITED STATES PATENT AND TRADEMARK OFFICE
CERTIFICATE OF CORRECTION

PATENT NO.   : 5,446,856
DATED        : August 29, 1995
INVENTOR(S)  : Baber et al.

It is certified that error appears in the above-identified patent and that said Letters Patent is hereby corrected as shown below:

Title page,
In the Abstract at [57] in line 4 delete "computers" and insert --computer,--

In the Abstract at [57] in line 21 delete the second occurrence of "with"

In column 2 at line 9 delete "Ydim" and insert --$Y_{dim}$--

In column 2 at line 31 delete "army" and insert --array--

In column 3 at line 52 delete "indicated" and insert --indicate--

In column 3 at line 55 delete "FIG. 1B arrays" and insert --FIG. 1B is a set of subarrays--

In column 6 at line 37 delete "army" and insert --array--

In column 8 at line 37 delete "Ydim" and insert --$Y_{dim}$--

Signed and Sealed this

Fourteenth Day of January, 1997

Attest:

BRUCE LEHMAN

*Attesting Officer*          *Commissioner of Patents and Trademarks*